United States Patent Office.

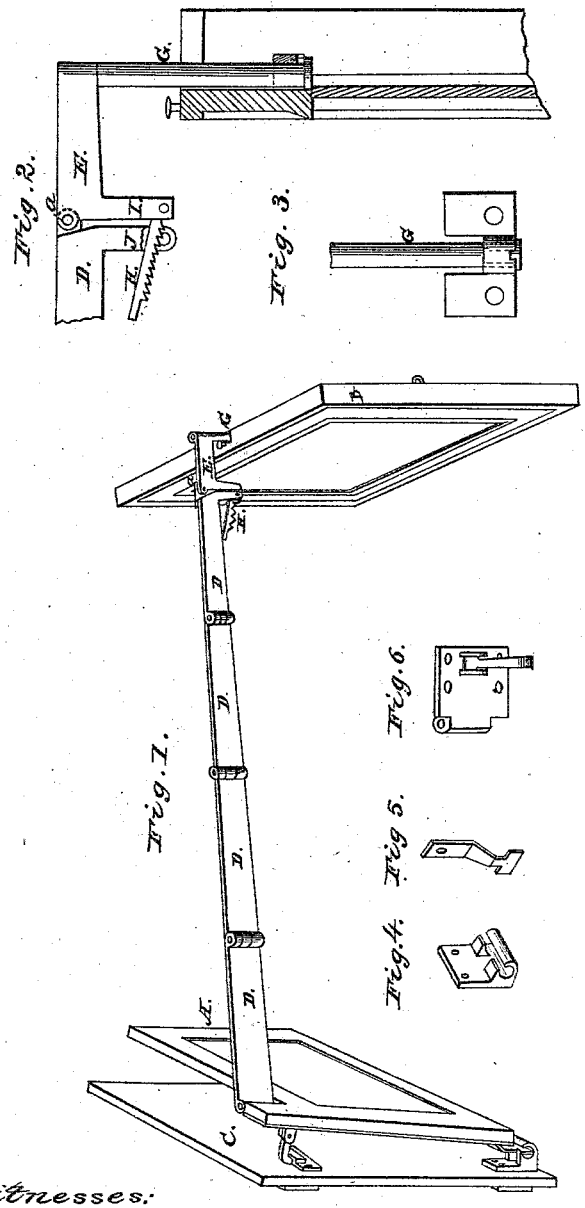

URBAN A. WOODBURY, OF MORRISVILLE, VERMONT.

Letters Patent No. 77,229, dated April 28, 1868.

IMPROVED LOOKING-GLASS.

*The Schedule referred to in these Letters Patent and making part of the same.*

TO ALL WHOM IT MAY CONCERN:

Be it known that I, URBAN A. WOODBURY, of Morrisville, in the county of Lamoille, and in the State of Vermont, have invented certain new and useful Improvements in Looking-Glasses; and do hereby declare that the following is a full, clear, and exact description thereof, reference being had to the accompanying drawings, and to the letters of reference marked thereon.

In the annexed drawings, making part of this specification, A and B represent two looking-glasses, of any usual construction, and of any desirable size.

C may represent a wall, to which the glass, A, is secured. This glass is intended to be stationary, while the glass, B, will be movable and adjustable. Secured to the upper edge of the frame of glass, A, is a jointed or hinged bar, D, which said bar is made as long as may be suitable, so that when the glass, B, is hung to its outer end there will be sufficient room for a person using the two glasses to stand between them and dress with ease and comfort.

G represents a pin or small shaft, which is connected to the back of the glass, B, and which extends a little above its upper edge at its centre. This shaft or pin is provided with an arm, E, which is hinged to the outer end of the bar D, as seen at $a$.

Extending downward from the ends of the arm E and the bar D are the arms I and J. To the arm I is pivoted a rack-bar, H, which said bar passes through a slot in the arm J, and catches with its teeth upon a suitable tooth or shoulder in said slot. The object of this hinge at $a$ and the rack-bar H is that the glass, B, may be adjusted and held at any desirable angle with the glass, A, so that the person using the glasses can see the back of their head or any portion of the back of their person. The shaft G is so connected to the glass, B, that said glass can be revolved about said shaft. The glass, B, is thus capable of several adjustments—one by the use of the hinges of the bar D; another by the use of the hinge at $a$ and the rack-bar H, and another by turning it partially around in either direction upon its shaft, G.

The bar D, being provided with several hinged sections, can be readily folded up and removed out of the way at pleasure.

The lower portion of the frame of glass, A, can be placed in a socket, or be hinged so that its upper edge may be adjusted to or from the wall, said upper edge being connected to the wall either by means of an adjustable bar or a cord or chain.

These glasses thus arranged will be of great service to ladies in making their toilets, as they can, by suitable adjustments, as readily see the back as the front of their person. One of these glasses will be fitted, when they are folded one within the frame of the other, so that they will have the appearance of only one glass.

Having thus fully described my invention, what I claim as new, and desire to secure by Letters Patent, is—

The shaft or pin G, with its arm E and arm I, connected to glass, B, and to bar D in such a manner that the glass can be revolved or adjusted and held at any desirable angle to the bar D and glass, A, as and for the purpose herein set forth.

In testimony that I claim the foregoing, I have hereunto set my hand, this 8th day of April, 1868.

URBAN A. WOODBURY.

Witnesses:
C. M. ALEXANDER,
J. M. MASON.